Patented June 13, 1950

2,511,310

UNITED STATES PATENT OFFICE 2,511,310

POLYMERIC COMPOUNDS FROM HYDROCARBON SILANE DIOLS AND POLYISOCYANATES OR POLYISOTHIOCYANATES

Robert W. Upson, Wilmington, Del., assignor to E. I. du Pont de Nemours & Company, Wilmington, Del., a corporation of Delaware No Drawing. Application December 16, 1946, Serial No. 716,673

12 Claims. (Cl. 260—46.5)

This invention relates to polymeric materials and more particularly to organo-inorganic polymers and to methods for their preparation.

Heretofore, polymers derived from organic compounds have been investigated extensively and are well known. However, relatively little is known of polymers derived from organo-inorganic compounds.

It is an object of this invention to prepare new polymeric materials from organo-inorganic compounds. A further object is the preparation of new linear polymers. A still further object is to prepare organo-inorganic polymers that are suitable for the manufacture of films, fibers and plastics. Another object is to prepare new polymeric materials from organo-silicon compounds. Other objects will appear hereinafter.

These objects are accomplished by the following invention of organo-inorganic polymers obtained by reacting an organo-inorganic compound having a plurality of groups each of which contains reactive hydrogen with an organic compound containing a plurality of separate NCX groups, wherein X is a chalcogen having an atomic number under 17, that is oxygen or sulfur.

In carrying out the preparation of the organo-inorganic polymers of this invention, an organo-inorganic compound having a plurality of groups, each of which contains reactive hydrogen as determined by the Zerewitinoff method, is reacted with an organic compound having a plurality of NCX groups, wherein X is oxygen or sulfur. In general, it is preferred to use bifunctional reagents since under these conditions linear polymers are obtained. In a preferred embodiment of this invention, an organo-silicon compound having directly connected to silicon a plurality of groups each of which contains reactive hydrogen, is reacted with a member selected from the class of polyisocyanates and polyisothiocyanates, preferably at a temperature of 35° to 200° C.

The preferred organo-inorganic compounds include the organosilanediols which have the formula $R_2Si(OH)_2$, wherein R is a monovalent hydrocarbon radical. Examples of this class of hydrocarbosilanediols include diphenylsilanediol, dibenzylsilanediol, dicyclohexylsilanediol, diethylsilanediol and the like. Siliconic acids may also be used, such as phenylsiliconic acid, but are not preferred since they give cross-linked polymers.

Other types of organo-silicon compounds suitable for use in this invention include organo-aminosilanes, compounds of the general formula $(RO)_2Si(OH)_2$, unsaturated organo-silicon compounds, and substituted organo-silicon compounds. Still other organo-inorganic compounds containing reactive hydrogen suitable for use in this invention include organo-boron compounds, such as aromatic boronic acids, aliphatic boronic acids, cycloaliphatic boronic acids and unsaturated aliphatic boronic acids. The preferred organo-inorganic reagents are those containing two reactive hydrogens, such as diphenylsilanediol.

Any polyisocyanate or polyisothiocyanate can be used in this invention. However, it is preferred to use diisocyanates and diisothiocyanates because of their ease of preparation, low cost, reactivity and reaction with bi-functional organo-inorganic reagents to give linear polymers. Thus, any diisocyanate or diisothiocyanate or mixed isocyanate-isothiocyanate, of the general formula XCNR'NCX', in which R' is a divalent hydrocarbon radical and X and X' are selected from the glass consisting of oxygen and sulfur, will react with organo-inorganic reagents having a plurality of groups containing reactive hydrogen to give polymers according to this invention. The preferred diisocyanates and diisothiocyanates are the saturated aliphatic diisocyanates and diisothiocyanates, such as hexamethylene diisocyanate.

A convenient way to carry out the reaction for the preparation of these new organo-inorganic polymers is to add an organo-inorganic reagent, having two groups, each of which contains reactive hydrogen, dissolved in an inert, anhydrous solvent, to a dry reaction vessel equipped with a reflux condenser, mechanical stirrer, dropping funnel, and nitrogen inlet tube. Dry nitrogen gas is passed through the reaction vessel until all of the air has been displaced with nitrogen. The stirrer is then started and the solution heated to reflux temperature. A solution containing an equivalent amount, based on the organo-inorganic reagent, of a diisocyanate or a diisothiocyanate, dissolved in an inert, anhydrous solvent is added slowly to the refluxing solution over a period of 0.5 to 5.0 hours. Sufficient solvent is used to give a clear, homogeneous solution after all of the diisocyanate has been added. The reaction is carried out at reflux temperature of the solvent for a further period of 0.5 to 20.0 hours. If desired, the reagents may be added in the reverse order to that described above.

The solvent is removed from the reaction mixture by distillation. The polymeric material that remains in the reaction vessel is transferred to a filter, washed with a solvent, such as anhydrous ether, to remove any unreacted monomer, and dried.

The polymers are, in general, solids of high softening points. They are soluble in phenol and in

Example I

To a reaction vessel equipped with a mechanical stirrer, nitrogen inlet tube and condenser set for distillation were added 100 parts diphenylsilanediol, 78 parts hexamethylene diisocyanate, 1.7 parts dodecyl alcohol and 103 parts dry dioxane. The reactants were stirred and heated in an atmosphere of nitrogen for 1 hour at a temperature of 110° C. and then for 3 hours at a temperature of 135° C. The dioxane was removed from the reactants under these conditions and a white polymeric material was deposited in the reaction vessel. The polymer was transferred to a filter, washed with hot benzene and methanol, and dried. The product softened at 230° C. and was soluble in phenol. Analyses indicated that the polymer contained 15.4% nitrogen and 4.2% silicon.

Example II

A solution containing 183 parts benzeneboronic acid dissolved in 879 parts anhydrous benzene was added to a dry reaction vessel equipped with a reflux condenser, mechanical stirrer, dropping funnel and nitrogen inlet tube, and the solution was heated to reflux temperature in an atmosphere of nitrogen. A solution containing 252 parts of hexamethylene diisocyanate dissolved in 879 parts anhydrous benzene was added slowly to the reaction vessel over a period of 0.5 hour. Carbon dioxide was liberated from the reaction solution on addition of hexamethylene diisocyanate and a clear solution was obtained after all the hexamethylene diisocyanate had been added. The solution was stirred and heated at reflux temperature for a further 0.75 hour after which time evolution of $CO_2$ was complete. The benzene was removed from the reaction solution by distillation. A white, solid polymeric product was obtained that was collected on a filter, washed with anhydrous ether and dried. The polymer softened at 195° C. and was soluble in phenol. Analyses indicated that the product contained 3.7% boron and 12.7% nitrogen. Clear, transparent films were pressed from this polymer at a temperature of 275° C.

The organosilanediols used in this invention may be prepared by hydrolysis of the corresponding organodichlorosilanes which may be obtained by reaction of a Grignard reagent with $SiCl_4$, J. A. C. S. 68, 344 (1946), J. A. C. S. 67, 2173 (1945). Boronic acids may be obtained by reaction of a Grignard reagent with an ester of boric acid as described in J. A. C. S. 54, 4415 (1932). The polyisocyanates and polyisothiocyanates may be prepared by known procedures, for example hexamethylene diisocyanate can be prepared by the process described in U. S. Patent 2,374,340, issued April 24, 1945.

Examples of various types of polyisocyanates and polyisothiocyanates particularly useful in this invention are polymethylene diisocyanates and diisothiocyanates, such as ethylene-, trimethylene-, and hexamethylene diisocyanates and the corresponding diisothiocyanates; alkylene diisocyanates and diisothiocyanates, such as propylene 1,2-, butylene-2,3-, and butylene-1,3-diisocyanates and the corresponding diisothiocyanates; alkylidene diisocyanates and diisothiocyantes, such as ethylidene-, butylidene- and heptylidene diisocyanates and the corresponding diisothiocyanates; cycloalkylene diisocyanates and diisothiocyanates, such as cyclopentylene-1,3- and cyclohexylene-1,2-diisocyanates and the corresponding diisothiocyanates; aromatic diisocyanates and diisothiocyanates such as metaphenylene-, p-phenylene-, 1-methyl-phenylene-2,4-, naphthalene-1,4-, and diphenyl-4,4-diisocyanates and the corresponding diisothiocyanates; and aliphatic-aromatic diisocyanates and diisothiocyanates, such as xylylene-1,4- and 4,4'-diphenylmethane diisocyanates and the corresponding diisothiocyanates. As examples of compounds containing more than two isocyanate or isothiocyanate groups may be mentioned 1,2,4-benzene triisothiocyanate and butane-1,2,2,-triisocyanate.

The reaction of organo-inorganic compounds containing reactive hydrogen with a polyisocyanate or polyisothiocyanate may be conducted either in the presence or in the absence of a solvent. However, it is preferred to carry out the reaction in the presence of an inert solvent to facilitate thorough mixing of the reactants and to provide a means for controlling the reaction temperature. Sufficient solvent is used to give a homogeneous solution when the reactants are mixed. Suitable solvents include benzene, toluene, xylene, ethers, dioxane and hydrocarbon solvents, such as hexane, cycloheptane, and the like. In general, any inert solvent may be used, that is any solvent may be used that does not contain groups that react with isocyanate or isothiocyanate groups or that react with the reactive hydrogen in the organo-inorganic compound. It is preferred to use anhydrous solvents.

Modifying agents, such as alcohols or tertiary amines, may be added to the reactants either at the start or at any stage of the polymerization. Alcohols act to terminate polymer chains and are useful in controlling the molecular weights of the polymers. Tertiary amines act as catalysts in the process of this invention.

The reaction time and temperature are interdependent variables. In general, it is desirable to operate at temperatures above 35° C. and below 200° C. The preferred temperature range is 50° to 150° C. Reactions carried out at temperatures below 50° C. must be conducted for several hours to produce polymers. Reactions carried out at temperatures substantially above 150° C. proceed rapidly and are likely to result in insoluble, infusible products. At any one temperature, the reaction is carried out until formation of $CO_2$ or COS is complete or until precipitation of polymer from the reaction solution is complete. The polymerizations are preferably stopped before the polymers become insoluble in phenol. A convenient way to control the reaction temperature is to carry out the reaction at reflux temperature in the presence of a solvent whose boiling temperature is the desired reaction temperature.

The reaction is preferably conducted in the absence of oxygen and moisture, which may be accomplished by operating in a partial vacuum or in the presence of an inert dry gas, such as dry nitrogen.

The polymer may be freed of solvent by direct distillation of the solvent under atmospheric or reduced pressure. It is advantageous in some cases to operate in a medium in which the polymer is insoluble and from which it separates as it forms.

The products of this invention are suitable for use in the preparation of fibers, films and plastics.

As many apparently widely different embodiments of this invention may be made without

I claim:

1. An organic polymer containing silicon which is the reaction product obtained by heating at a temperature of 35° to 200° C. equivalent proportions of a silanediol having the formula $R_2Si(OH)_2$, wherein R is a monovalent hydrocarbon radical, and of an organic compound containing, as the sole reacting groups, a plurality of NCX groups wherein X is a chalcogen having an atomic number under 17, said organic compound being hydrocarbon except for said NCX groups.

2. An organic polymer containing silicon which is the reaction product obtained by heating at a temperature of 35° to 200° C. equivalent proportions of a silanediol having the formula $R_2Si(OH)_2$, wherein R is a monovalent hydrocarbon radical, and of an organic compound containing, as the sole reacting groups, only two separate NCX groups wherein X is a chalcogen having an atomic number under 17, said organic compound being hydrocarbon except for said NCX groups.

3. An organic polymer containing silicon which is the reaction product obtained by heating at a temperature of 35° to 200° C. equivalent proportions of a silanediol having the formula $R_2Si(OH)_2$, wherein R is a monovalent hydrocarbon radical, and of a hydrocarbon diisocyanate.

4. An organic polymer containing silicon which is the reaction product obtained by heating at a temperature of 35° to 200° C. equivalent proportions of a silanediol having the formula $R_2Si(OH)_2$, wherein R is a monovalent hydrocarbon radical, and of hexamethylene diisocyanate.

5. An organic polymer containing silicon which is the reaction product obtained by heating at a temperature of 35° to 200° C. equivalent proportions of diphenylsilanediol and a hydrocarbon diisocyanate.

6. An organic polymer containing silicon which is the reaction product obtained by heating at a temperature of 35° to 200° C. equivalent proportions of diphenylsilanediol and hexamethylene diisocyanate.

7. A process for preparing an organic polymer containing silicon which comprises heating to a temperature between 35° and 200° C. equivalent proportions of a silanediol having the formula $R_2Si(OH)_2$, wherein R is a monovalent hydrocarbon radical, and of an organic compound containing, as the sole reacting groups, a plurality of NCX groups wherein X is a chalcogen having an atomic number under 17, said organic compound being hydrocarbon except for said NCX groups.

8. A process for preparing an organic polymer containing silicon which comprises heating to a temperature between 35° and 200° C. equivalent proportions of a silanediol having the formula $R_2Si(OH)_2$, wherein R is a monovalent hydrocarbon radical, and of an organic compound containing, as the sole reacting groups, only two separate NCX groups wherein X is a chalcogen having an atomic number of 17, said organic compound being hydrocarbon except for said NCX groups.

9. A process for preparing an organic polymer containing silicon which comprises heating to a temperature between 35° and 200° C. equivalent proportions of a silanediol having the formula $R_2Si(OH)_2$, wherein R is a monovalent hydrocarbon radical, and of a hydrocarbon diisocyanate.

10. A process for preparing an organic polymer containing silicon which comprises heating to a temperature between 35° and 200° C. equivalent proportions of a silanediol having the formula $R_2Si(OH)_2$, wherein R is a monovalent hydrocarbon radical, and of hexamethylene diisocyanate.

11. A process for preparing an organic polymer containing silicon which comprises heating to a temperature between 35° and 200° C. equivalent proportions of diphenylsilanediol and a hydrocarbon diisocyanate.

12. A process for preparing an organic polymer containing silicon which comprises heating to a temperature between 35° and 200° C. equivalent proportions of diphenylsilanediol and hexamethylene diisocyanate.

ROBERT W. UPSON.

REFERENCES CITED

The following references are of record in the file of this patent:

UNITED STATES PATENTS

| Number | Name | Date |
|---|---|---|
| 2,284,896 | Hanford et al. | June 2, 1942 |
| 2,374,136 | Rothrock | Apr. 17, 1945 |

OTHER REFERENCES

Kraus, Journ. Amer. Chem. Soc., vol 47, pp. 2739, 2746, 2748 (1925).

Sauer, Jour. Amer. Chem. Soc. vol. 68, pp. 241 to 244 (1946).

Rochow, Introduction to the Chemistry of the Silicones, Wiley (1946), pp. 34 to 36.

Stock, Hydrides of Boron and Silicon, Cornell U. Press (1933), pp 30–31.